United States Patent [19]

Crawford et al.

[11] Patent Number: 5,210,845
[45] Date of Patent: May 11, 1993

[54] CONTROLLER FOR TWO-WAY SET ASSOCIATIVE CACHE

[75] Inventors: John H. Crawford; Sundaravarathan R. Iyengar; James Nadir, all of Santa Clara, Calif.

[73] Assignee: Intel Corporation, Santa Clara, Calif.

[21] Appl. No.: 618,708

[22] Filed: Nov. 28, 1990

[51] Int. Cl.⁵ .................. G06F 12/00; G06F 13/14; G11C 15/04
[52] U.S. Cl. .................. 395/425; 365/49; 364/DIG. 1; 364/243
[58] Field of Search ............ 395/425; 364/DIG. 1, 364/243; 365/49

[56] References Cited

U.S. PATENT DOCUMENTS

| | | | |
|---|---|---|---|
| 4,580,240 | 4/1986 | Watanabe | 365/49 |
| 4,758,982 | 7/1988 | Price | 365/49 |
| 4,833,642 | 5/1989 | Ooi | 365/49 |
| 4,945,512 | 7/1990 | DeKarske et al. | 365/49 |

*Primary Examiner*—Alyssa H. Bowler
*Attorney, Agent, or Firm*—Owen L. Lamb

[57] ABSTRACT

A cache controller (10) which sits in parallel with a microprocessor bus (14, 15, 29) so as not to impede system response in the event of a cache miss. The cache controller tagram (24) is configured into a two ways, each way including tag and valid-bit storage for associatively searching the directory for cache data-array addresses. The external cache memory (8) is organized such that both ways are simultaneously available to a number of available memory modules in the system to thereby allow the way access time to occur in parallel with the tag lookup.

3 Claims, 5 Drawing Sheets

CONTROLLER FOR TWO-WAY SET ASSOCIATIVE CACHE

TECHNICAL FIELD

The present invention relates to data processing systems and more particularly, to controller and data cache which provides local storage for frequently accessed memory locations.

BACKGROUND ART

A cache is a relatively high-speed, small, local memory which is used to provide a local storage for frequently accessed memory locations of a larger, relatively slow, main memory. By storing the information or a copy of the information locally, the cache is able to intercept memory references and handle them directly without transferring the request to the main memory over the system bus. The result is lower traffic on the memory bus and decreased latency on the CPU bus to the requesting processor.

The most powerful microprocessor now used in IBM compatible personal computers is the Intel 80486 which uses caching to satisfy the increasing demands of application programs for more memory and faster operating speeds. The Intel 80486 has a main processor, a math coprocessor and a cache controller with 8K bytes of RAM data cache all integrated on a single chip. The purpose of the internal cache is to reduce the number of times the CPU has to interface with external memory subsystems for its instructions and data. This is accomplished as follows. When the CPU requests data, the address of the data is examined by the internal 8K RAM cache to see if the data is in the cache. If the data/instruction is in the internal cache, the CPU request can be satisfied within about 15 ns as opposed to 70 to 100 ns when data instruction is not in the internal cache.

In order to further reduce the access time when the data/instruction is not in the internal cache, a second-level cache is often used. A second-level cache is external to the 80486 CPU, but supports much faster access times than the main memory.

As their needs expand, users may also want to add on more memory, so it is also advantageous to have a single second-level cache controller that can map to a very large address space and selectively to a smaller address space, depending upon the configuration of memory modules in the system.

It is therefore an object of the present invention to provide a cache controller which can be added to an existing microprocessor as an end-user installable module.

It is also an object of the present invention to provide a cache controller that can map to a very large address space and selectively to a smaller address space, depending upon the configuration of memory modules in the system.

SUMMARY OF THE INVENTION

Briefly, the above objects are accomplished in accordance with the invention by providing a cache controller which sits in parallel with the microprocessor bus so as not to impede system response in the event of a cache miss. The cache controller is configured into a plurality of ways, each way including tag and valid-bit storage for associatively searching the directory for cache data-array addresses.

The invention has the advantage that both the second-level cache and the main memory can simultaneously begin to look up the access address.

In the event of a cache hit, the data/instruction is supplied by the cache with zero wait-state. In the event of a cache-miss, the parallel look-up technique incurs no additional penalty.

The invention has the advantage that the cache module allows a system to reconfigure itself easily once a cache module has been installed.

The invention has the advantage that it provides high performance with Zero Wait-state Access, One Clock Bursting, Two-Way Set Associative, BIOS ROM Caching and will operate at 25/33 MHz.

The invention has the advantage that it provides for a 0, 64k, 128k cache with single socket and is cascadable with multiple sockets.

The invention has the advantage that it is easy to use, it is software transparent, can be installed by the end user, and provides write-through memory update using the same timing as the CPU.

The invention has the advantage that no jumpers, configuration software, nor BIOS/applications/operating system support is required to get 5–30% performance boost after installing the cache.

BRIEF DESCRIPTION OF THE DRAWINGS

The invention will be apparent from the following, more particular description of the preferred embodiment of the invention as illustrated in the accompanying drawings, wherein.

DESCRIPTION OF THE PREFERRED EMBODIMENT

Figure 1:
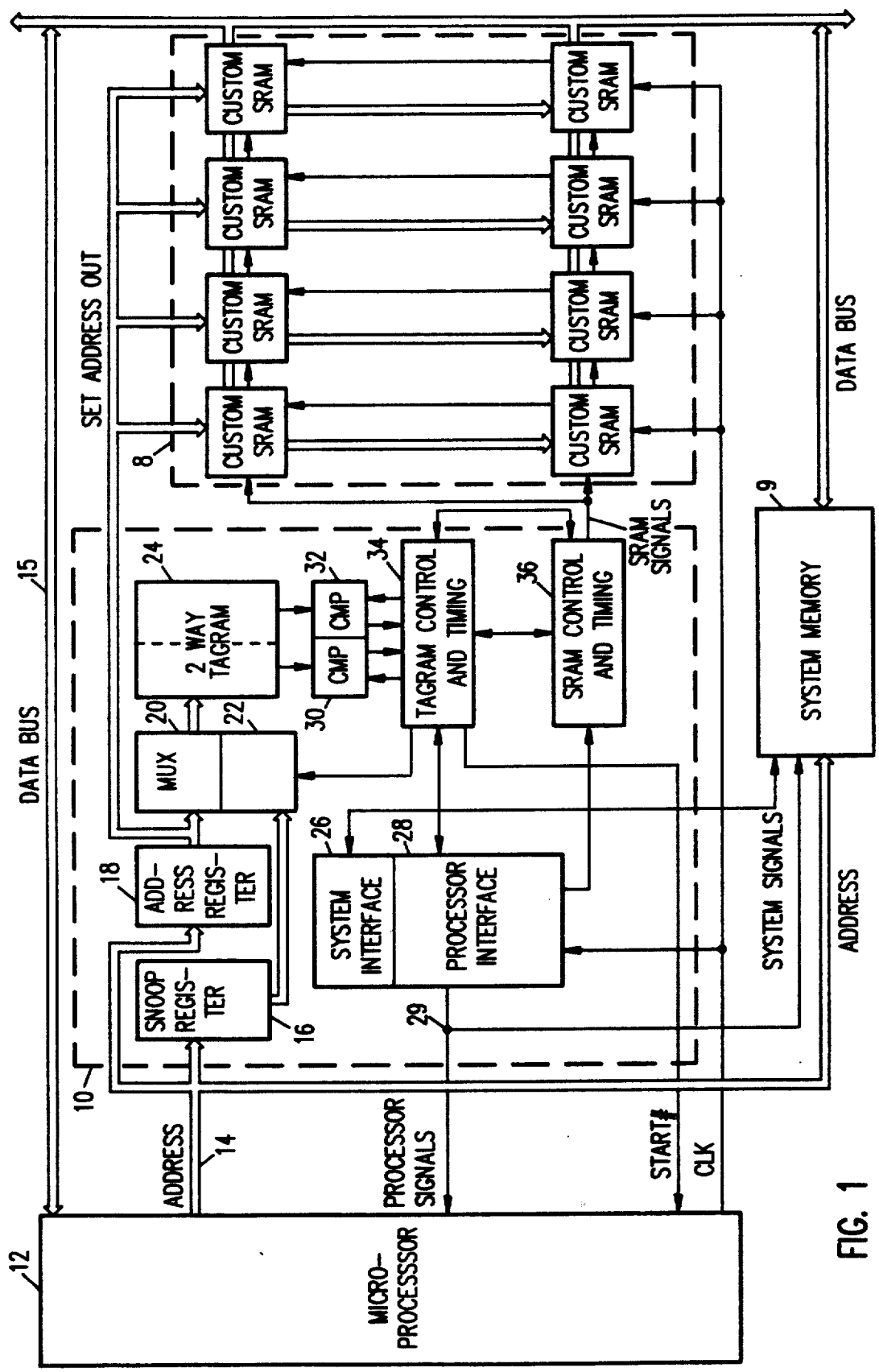
FIG. 1 is a block diagram of a data processing system in which the invention is embodied.

Refer now to FIG. 1 which is a block diagram of a data processing system in which the invention is embodied. The cache module (10) of the present invention is a second level, single-ported, optional, add-on cache controller for a microprocessor (12), such as the Intel 80486. It monitors CPU address bus (14) activity to determine when it needs to search its internal TAG RAM (24). The cache module sits in parallel with the microprocessor signal bus (29), address bus (14) and data bus (15) so as not to impede system response in the event of a cache miss.

The cache is organized as two-way set-associative. The controller supports either two lines per tag (sectored) or one line per tag (non-sectored). A single cache module will directly support a non-sectored 64K data cache or a 128K sectored data cache. The data cache (8) resides external to the cache controller. The cache controller buffers the data cache's addresses in a snoop register (16) and address register (18) and supplies all other data cache control to support no wait state processor operation when there is a cache hit. The cache module has provisions to support Snoop cycles, Back Off, and premature BLAST terminations. Internally, the cache controller maintains the TAG address and Status of each data cache line. To select sectored cache operation, A4 of the processor address bus (14) is connected to the cache module's LS (Line Select) pin. Non-sectored cache operation is selected by strapping LS low.

External Cache Module Only Caching

The WPSTRP strapping option allows the cache module to support those situations where it is desired to cache data in the cache module but not in the internal cache in the microprocessor (12). Such situations arise when a portion of the processor's code resides in ROM. If ROM data is allowed to be internally cached in the on-chip cache within the microprocessor, it is possible that the microprocessor could write to a ROM location in its internal cache when in fact writes to ROM locations are forbidden by the system. When the WPSTRP option is tied low, the cache module will suppress the second CKEN# pulse used to validate the line fill to the processor.

64K Non-Sectored and 128K Sectored Cache

The cache module is two-way set-associative. The Line Select (LS) input pin determines whether the ways (24) are sectored or non-sectored. Strapping LS low will configure the internal TAG RAM to support a 64K non-sectored cache. Connecting LS to A4 of the processor's address bus will configure the internal TAG RAM (24) to support a 128K sectored cache. When configured for a non-sectored cache, there is one TAG address per line (a line consists of 16 bytes), a Valid bit (V), and one Write Protect bit (WP). In the sectored organization, there is one TAG address and one WP bit for every two lines. In this case, each line still has its own V bit. The reason for a sectored cache is that a larger data cache can be supported without significantly increasing the on-chip TAG/STATUS RAM (24).

The cache module has a sufficient number of TAG address bits to decode 4 Gigabytes of the microprocessor's physical address space in the system memory (9). Thus it is possible to have a 64K (non-sectored) or a 128K (sectored) data cache controlled by a single cache module cover up to 4 gigabytes. Using two cache module controllers, a 128K (non-sectored) or 256K (sectored) data cache will cover up to 4 gigabytes.

Microprocessor Interface

The cache module directly interfaces to the microprocessor via processor interface (28). All i486 microprocessor timings are supported. System reset will cause the cache module to invalidate all TAG entries in its internal RAM (24). Reset has the same timings as the i486 microprocessor. FLUSH# also invalidates all the TAGs but does not force the cache module into the idle state. The cache module FLUSH# input timings are identical to the FLUSH# input timings requirements of the i486 microprocessor.

Figure 2:
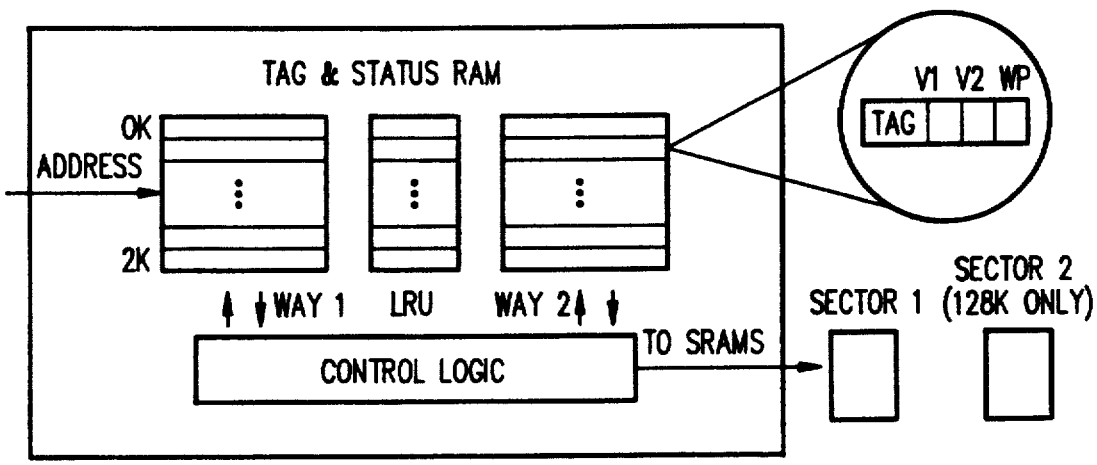
FIG. 2 is a block diagram of the cache controller shown in FIG. 1.

Refer to FIG. 2. The function of the directory is to store addresses which correspond to data which are stored in the cache memory. The directory is configured into two ways (WAY0, WAY1). A line is the basic unit of data transferred between the cache and the main memory. It consists of 16 bytes of data. A line is also known as a transfer block. If the data corresponding to a particular address is stored in the cache, the cache can supply the data, thus avoiding a main memory access. This is referred to as "cache hit." The decision, hit or miss, is determined on a per line basis. An address block is the basic unit of cache addressing. Each address block describes the physical address of one of two contiguous lines of data.

There is a valid bit associated with each line within an address block. If the line is present in the cache, then the valid bit is turned on. The address information held in the cache directory is referred to as a tag. Since many addresses map to a single address block, the tag information is used to identify the exact memory locations that are currently associated with an address block. A hit occurs when the tag of an address block matches the bus address and the desired line valid bit is on.

Each way provides storage for the tag and valid bits. Multiple simultaneous comparisons are made in the compare circuits between the bus address and the tag fields in the ways to determine if the data is in the cache data array. A set is a grouping of address blocks consisting of one address block from each way. All of the address blocks in a set are simultaneously selected when a portion of the CPU bus address is decoded into a set address by the decoder. The directory shown in FIG. 2 provides for 64 sets.

When a new block of data needs to be pulled into the cache, it may be necessary to remove an old block of data that is already in the cache to make room for the new data. There is a sequence for determining which way gets replaced when a new address is needed in an address block.

When a write transaction on the CPU bus involves an address which is not in the cache (a cache miss), no attempt is made to store the corresponding data in the cache. However, when a write transaction on the CPU bus involves an address which is in the cache (a cache hit), the directory uses a write-through policy. This means that CPU bus writes that result in a cache hit are written into the cache as well as main memory. This ensures that main memory always holds a valid copy of all data locations.

PIN DESCRIPTION OVERVIEW

Pin signals are described below by pin name, followed by type of signal, input (I), output (O), or both (I/O), active high or low, and a brief description.

Control Signals

CLK I—CLOCK is the timing reference from which the module monitors and generates events. CLK must be connected to the CPU CLK pin.

RESET I High RESET CACHE forces the module to begin execution in a known state and must be connected to the CPU RESET pin. It also causes all cache lines to be invalidated. Setup and hold times t23 and t24 must be met for recognition in any specific clock.

ADS# I Low ADDRESS STROBE is generated by the Microprocessor. It is used to determine that a new cycle has been started. Setup time t7 must be met for proper operation.

M/IO# I—MEMORY/IO is a CPU generated cycle definition signal that indicates a Memory (M/IO# high) or I/O (M/IO# low) access. Setup time t7 must be met for proper operation.

W/R# I—WRITE/READ is a CPU generated cycle definition signal used to indicate a Write (W/R# high) or Read (W/R# low) access. Setup time t7 must be met for proper operation.

START# O Low MEMORY START indicates that a cache read miss or a write has occurred and that the current access must be serviced by the memory system. START# is not activated for I/O cycles, and is not asserted if CS# is inactive.

BRDYO# O Low BURST READY OUT is a burst ready signal driven by the module to the CPU. It is activated when a read hit occurs to the module and should be a term in the BRDY# input to the CPU.

CBRDY# I Low CACHE BURST READY IN is the burst ready input from the memory system. It is applied to both the module and the CPU BRDY# pin in parallel. CBRDY# is ignored during T1 and idle cycles. BLAST# determines the length of the transfer. All cacheable read cycles are 4 dword transfers. Setup and hold times t9 and t10 must be met for proper operation.

CRDY# I Low CACHE READY IN is the nonburst ready input from the system. Like CBRDY#, it is applied to both the cache and CPU RDY# pin in parallel. CRDY# is ignored during T1 and idle cycles. Setup and hold times t9 and t10 must be met for proper operation.

BLAST# I Low BURST LAST is output by the CPU and is sampled by the module to determine when the end of a cycle occurs. Setup and hold times t8 and t8a must be met for proper operation.

BOFF# I Low BACKOFF is a CPU input sampled by the module to indicate that a cycle be immediately terminated. If BOFF# is sampled active, the module will float its data bus. The module will ignore all cycles, except invalidation cycles, until BOFF# is deactivated. Setup and hold times t17 and t18 must be met for proper operation.

PRSN# O Low PRESENCE is an active low output always asserted by the module. It may be used as a module presence indicator and is connected via a 10K pullup resistor.

Address Signals

A2-A31 I—PROCESSOR ADDRESS LIENS A2-A31 are the CPU address lines used by the module. Address lines A2 and A3 are used as burst address bits. In the 64k module, A4-A14 comprise the set address inputs to the module and A15-A31 are used as the tag address. In the 128k module, A4 becomes a line select input, A5-A15 is the set address input and A16-A31 is used as the tag address. Setup time t6 must be met for proper operation.

BE0#-BE3#I Low BYTE ENABLE inputs are connected to the CPU byte enable outputs. These are used to do partial writes during hit cycles. On read cycles, they are ignored. Setup time t6 must be met for proper operation.

CS# I Low CHIP SELECT is used to cascade cache modules. Address bits may be decoded in order to cascade multiple devices or be decoded to selectively cache portions of memory. Setup and hold times t30 and t31 must be met for proper operation.

Data Signals

D0-D31 I/O—PROCESSOR DATA LINES D0-D31 are connected to the CPU data bus. D0-D7 define the least significant byte while D24-D31 define the most significant byte. Setup and hold times t13 and t14 must be met for proper operation.

DP0-DP3 I/O—DATA PARITY are the parity bits associated with the data on the data bus. They are connected to the CPU pins with the same name. Parity is treated by the module as additional data bits to be stored. Setup and hold times t13 and t14 must be met for proper operation.

Cacheability Signals

CKEN# O Low CACHE ENABLE TO CPU is the KEN# term generated by the module to the Microprocessor. CKEN# is activated twice; First during T1 to enable a cache line fill, and second on the clock before the last BRDY# or RDY# to validate the line fill. CKEN# is ALWAYS active in T1, but will not validate a line fill if the line fill is a write protected line and WPSTRP# is low, or if the cycle is a read miss.

SKEN# I Low SYSTEM CACHE ENABLE is an input from the main memory system to indicate whether the current line fill is cacheable in the module.

It is sampled by the module exactly like KEN# is sampled by the Microprocessor. Setup and hold times t11 and t12 must be met for proper operation.

FLUSH# I Low FLUSH CACHE causes the module to invalidate its entire cache contents regardless of CS#. Any line fill in progress will continue, but will be invalidated immediately. The CPU flush instruction does not affect the module. Setup and hold times t23 and t24 must be met for recognition in any specific clock.

WP I High WRITE PROTECT defines a line as write protected. WP is sampled during the third transfer of a line fill and is maintained internally as a state bit. Any subsequent writes to a write protected line will have no effect. Setup and hold times t15 and t16 must be met for proper operation.

WPSTRP# I Low WRITE PROTECT STRAPPING OPTION changes the behavior of CKEN#. CKEN# is always asserted in T1 to indicate a cacheable line transfer but is deasserted on the next clock. During read hit cycles, CKEN# is asserted again for the duration of the transfer to indicate a cacheable line fill. If WPSTRP# is strapped low, and a write protected line is being transferred, CKEN# is not activated again for the transfer. This prevents the CPU from Caching write protected lines during read high cycles.

Invalidate Signals

EADS# I Low VALID EXTERNAL ADDRESS STROBE indicates that an invalidation address is present on the CPU address bus. The module will invalidate this address, if present, but will only do so if CS# is active. The module is capable of accepting an EADS# every other clock. The module EADS# should be connected to the CPU EADS# pin. Setup and hold times t19 and t20 must be met for proper operation.

Functional Description

The cache module is a complete 2-way set-associative 64k or 128k cache which is housed in a 113-pin module. It contains 4 or 8 custom data SRAMs and a cache controller. The cache module is cascadable to a maximum of 512k with the addition of more modules. The module in accordance with the present invention is such that the system may easily detect a cache's presence and reconfigure itself accordingly.

The cache module interfaces directly to the Microprocessor, and it directly supports the timing of 25 and 33 MHz systems. It is capable of reading and writing data in 0 waitstates, and performing 1 clock bursting. The module recognizes CPU invalidations, use of BOFF#, and prematurely terminated cycles. The cache module is write-through so it supports the same CPU consistency mechanisms, stores data parity, can cache BIOS in modes where the CPU cannot, is software transparent, and may be an end-user installable upgrade.

The module shown in FIG. 1 contains a cache controller (10) and 4 Intel 82485MA SRAMs or 8 Intel 82485MB SRAMs (8) for a complete 64k or 128k cache. In either configuration, the module is 2-way set-associative with a 16 byte line size.

Each WAY contains 2k tags with 17 bits per tag so it may store the complete 4G real address space. The tags also reference 2 valid bids (v) and a write-protect bit (wp). When configured as a 64k cache, each tag references a single, 16 byte line. When configured as a 128k cache, each tag is forced to reference two consecutive 16 byte lines. This is called a sectoring. A 128k module contains 2 sectors per tag. The LS input (address bit A4) determines which sector of each tag is being selected.

The control units are responsible for three main functions: controlling the data SRAMs, controlling the tagram structure, and interfacing to the CPU. Since these are independent units, the cache controller is capable of updating its tagram while data is being bursted into SRAM, or invalidating during a line fill to a different address. Special address registers in the module allow the Microprocessor to drop its address in the first T2 (in response to AHOLD) and the system to issue a invalidate address with a CPU hold time.

The cache controller uses a Least Recently Used (LRU) algorithm to determine which tag should be invalidated on cache misses. A single LRU bit per tag is used to point to the tag that will be replaced should a replacement be required.

The data memory portion (8) of the module is composed of a set of custom SRAMs that operate at fast 33 MHz speeds. They are capable of 0 waitstate reads and writes, and single clock bursting, and have minimized capacitive loading on the CPU clock and data lines.

Cache Operation

To operate at high speeds, the module must begin its tag lookup to determine a cache hit or miss as soon as possible. During normal operation, this done is as soon as the CPU generates an address. SRAM reads, SRAM writes, and system signals cannot be generated until a hit or miss has been determined. The following sections describe read miss, read hit, write, invalidate, and BOFF# cycles.

Read Miss

Figure 3:
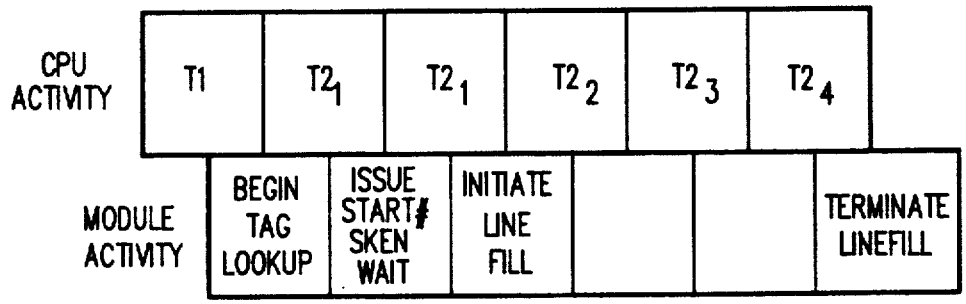
FIG. 3 is a timing diagram which shows module activity during a normal read miss cycle.

FIG. 3 is a timing diagram which shows module activity during a normal read miss cycle. In T1, the module begins its tag lookup to see if the read cycle is a hit. Once it has been determined that the address is not present in the cache (a miss), START# is issued to indicate to the memory system that it must service the current cycle. The cache is then idle until SKEN#, the cache's KEN# input, is seen active. Should SKEN# be inactive and the burst line transfer from memory begin, the line is non-cacheable and is ignored.

Once SKEN# has been asserted, the module invalidates a line in the cache (or chooses a free line) in preparation for the bursted data. The data is bursted into the cache and to the Microprocessor simultaneously. If an SKEN# preceded the last bursted item, then the line was cacheable, and the module updates its valid bit to indicate so. If the line is invalid, or aborted for any reason (BLAST#, BOFF# RESET, RESET, EADS#) the line is left invalid.

During a read miss cycle, the module cannot accept the data from memory in zero waitstates. The earliest data may be returned is the clock after START# is sampled active. START# is the signal that indicates that the memory system must complete the current cycle.

The module is also capable of handling non-burst and interrupted burst line fills.

Read Hit

During Read Hit cycles, the module responds directly to the Microprocessor with a line of data in 5 clocks. The module asserts CKEN# (its KEN# output to the CPU) in both T1 and the third T2 to indicate this as a cacheable transfer. Should the bursted line be write-protected, and WPSTRP# is strapped low, CKEN# is high for the third T2 and the line is not cached by the CPU.

Write Cycles

Figure 4:
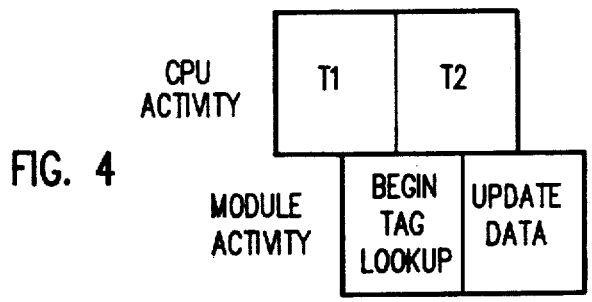
FIG. 4 shows a write hit where the tag lookup in T1 is found to be a hit so the data is updated by the cache in T2.

Since the module is a write-through cache, all write cycles are written by the CPU to main memory. FIG. 4 shows a write hit where the tag lookup in T1 is found to be a hit so the data is updated by the cache in T2. Write misses do not affect cache contents, nor do writes to write protected lines. Write hits will alter the LRU bit to point to the way where the line resides.

Invalidation Cycles

The module allows invalidation cycles to occur at any time by asserting AHOLD and EADS#. Self-invalidations, where AHOLD is not asserted, are allowed at any time except on the clock edge of the last transfer of a line fill. EADS# assertion allows both the CPU cache and module to be invalidated at the same time. Regardless of what the module is doing, EADS# causes the address present on the address inputs of the module to be invalidated. This includes read hit, read miss, write, and BOFF# cycles.

Figure 5:
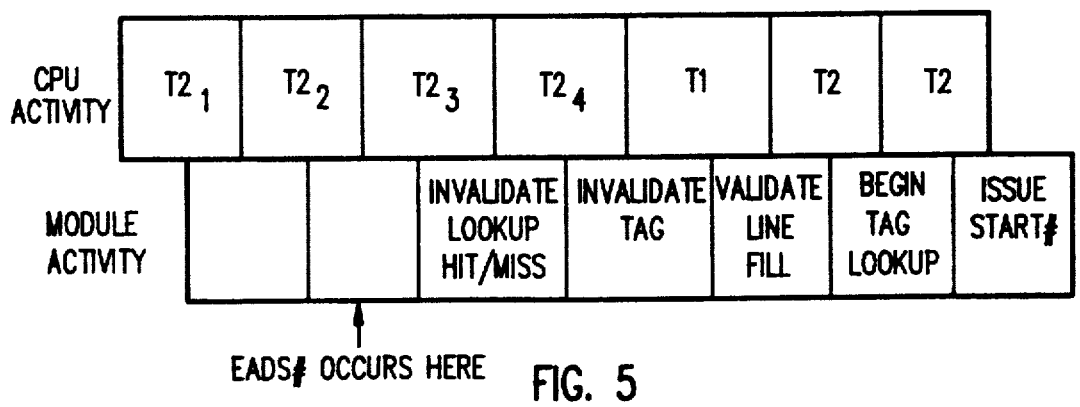
FIG. 5 is a timing diagram which shows a read miss cycle with an invalidate occurring in the third transfer of a line fill.

FIG. 5 is a timing diagram which shows a read miss cycle with an invalidate occuring in the third transfer of a line fill. Under normal conditions, the module would, on the next clock, validate the current line that is being filled. Since the EADS# occurs here, the tagram is occupied on the next clock with a tag lookup to see if the invalidate is a hit, and the current line is not yet validated. If it is a hit, the next cycle is used to perform the actual invalidation. The following clock is spent validating the current line fill. Should the Microprocessor begin a cycle immediately, the module is not able to perform its tag lookup until a clock cycle later when the tag memory is free. This causes START# to be delayed, and ultimately, delays a memory read cycle.

For greatest performance, EADS# should not be issued in the second, third or fourth transfer of a cache line fill.

If a self-invalidation occurs in T1, ADS# and EADS# are sampled at the same time, the module will invalidate the line and assert START# as in a normal read miss cycle. If EADS# is asserted at any other time during a read hit, START# is not asserted.

BOFF# Cycles

When BOFF# is asserted, the module, like the Microprocessor, will relinquish the bus in the next clock cycle. While BOFF# is asserted, as any other time, the module monitors EADS# to perform any invalidate cycles.

If BOFF# is asserted during a cache read hit (data is being transferred from cache to CPU), the module invalidates the line being transferred. Once BOFF# has been released and the cycle resumes, the module sees this as a cache miss and the memory system must supply the remaining data. If BOFF# is asserted during a cache read miss (memory is transferring to cache and CPU), the module will treat the line fill like an aborted fill, and the line will remain invalid. Once BOFF# is released and the cycle is restarted, the remainder of the line fill is treated like another fill, and remains invalid due to the fact that the restarted cycle would do only a partial fill.

Figure 6:
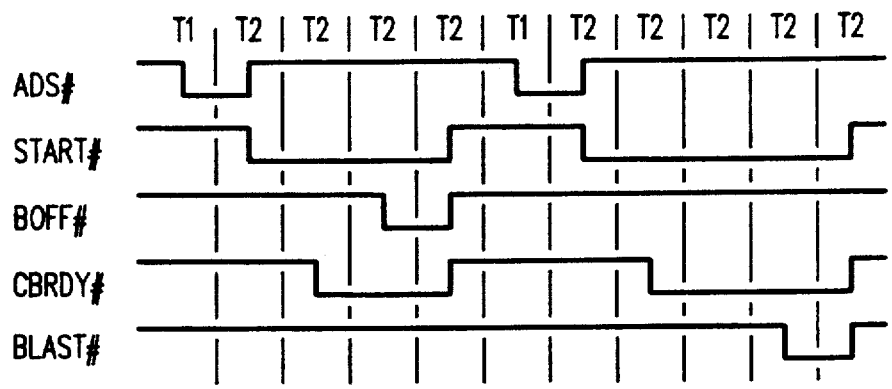
FIG. 6 is a timing diagram which shows an example of an aborted line fill.

FIG. 6 is a timing diagram which shows an example of an aborted line fill. Since the line transfer is interrupted before the transfer completes, it stays invalidated. Once the transfer resumes, the module sees a new cycle begin with ADS#, but it completes with BLAST# after three transfers. It treats this as a prematurely terminated line fill cycle, and the cycle is never validated.

Figure 7:
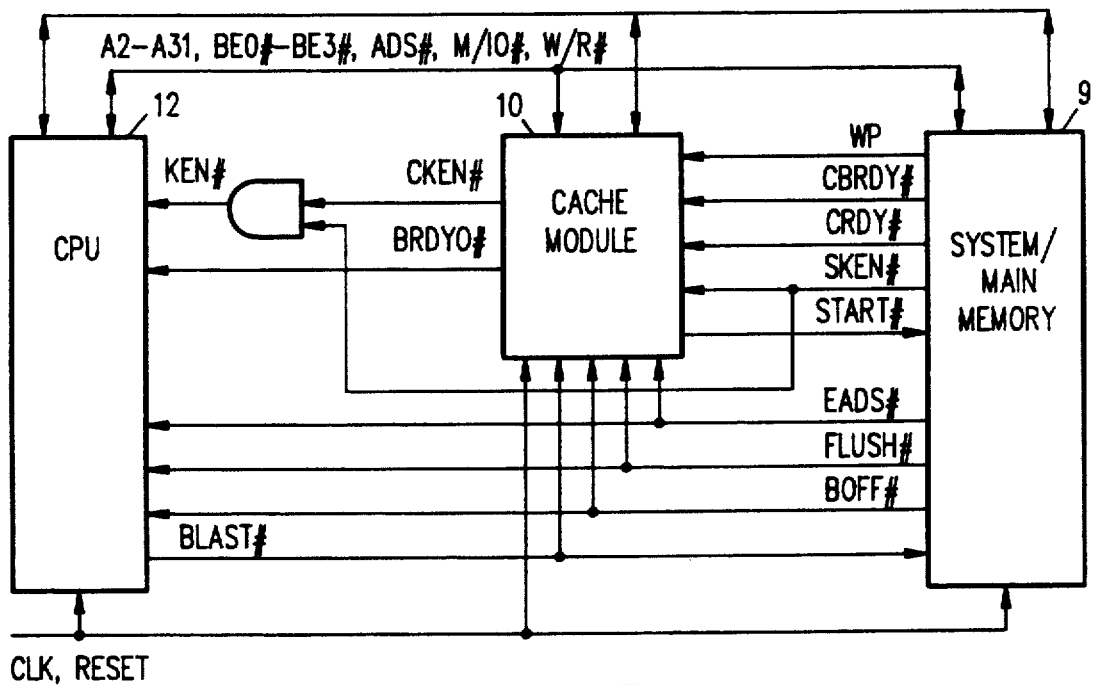
FIG. 7 shows a typical module connection to a Microprocessor and memory subsystem.

A typical module connection to a Microprocessor and memory subsystem is shown in FIG. 7. All of the signals that the CPU generate "feed-around" the module; they go to both the module and the memory controller. Most memory generated signals feed-around the module back to the CPU. This is what makes the module an optional cache. All of the signals the module encounters are described below.

Microprocessor Signals

The following module signals connect directly to the corresponding CPU signals. These pins have the same name and functionality as the Intel i486 Microprocessor pins.

Address Lines A2–A31

A2–A31 are the address lines generated by the CPU and used by the cache as set and tag addresses. A 64k module cache will use A4–A14 as set address inputs and the remaining address bits as tag address. A 128k module uses A5–A15 as set address inputs, A4 as the line select bit for sectoring, and the remaining bits as tag address. Address lines A2 and A3 are used as burst address inputs.

The address lines are also used as invalidate inputs. At any time, if EADS# is asserted, the tag contents corresponding to the address that is present at the address inputs will be invalidated. The module will not invalidate unless CS# is sampled active. Note that the address is latched internally so that AHOLD assertion in T1 is permitted.

Data Lines D0–D31 and Parity DP0–DP3

This is the processor data bus common to the CPU, the module, and memory bus. The module transfers information to the CPU on read bits, and stores data from memory on read misses. The four parity bits, DP0–DP3 are treated just like extra data bits.

ADS#, W/R#, M/IO#

The processor control signals ADS#, W/R#, and M/IO# are used by the module to indicate the start of a new cycle, and identify the type of cycle. ADS# assertion indicates a T1 cycle and initiates the tag lookup process in the module. I/O cycles are ignored. They are also used during interrupted burst transfers to mark the start of each transfer.

Byte Enables BE0#–BE3#

Byte enable inputs are used to complete partial byte or word writes to the module on cache write hit cycles. Partial transfers during a read cycle will be treated like full transfers by the module.

BLAST#

BLAST# is used by the module to indicate the end of a cycle. If BLAST# is asserted easily during a cache line fill from a read miss, that transfer is left invalid by the module. BLAST# has a meaning only when accompanied by RDY#, BRDY#, or BRDYO#.

BOFF#

Once BOFF# is sampled by the module, it relinquishes control of the data bus by the next clock. If a read hit line transfer was in progress, the corresponding line will be invalidated. If a read miss transfer was interrupted by BOFF#, the module would leave the line invalidated. The module will recognize EADS# during BOFF#, but will only do so if CS# is active.

FLUSH#

The module FLUSH# input behaves exactly like the Microprocessor input. Once asserted, FLUSH# will invalidate the entire contents of its cache memory regardless of the state of CS#. While FLUSH# is asserted, the module continues to track CPU bus cycles and treats all accesses as cache misses, activating START# appropriately.

FLUSH# may be used asynchronously with both the CPU and the module. If the proper pulse widths are given, FLUSH# will be recognized, but, it is possible that the FLUSH# will be recognized on different clock edges for each device. This may happen if FLUSH# assertion or deassertion is near its setup and hold times when one device may recognize it and the other may not.

EADS#, AHOLD

EADS# assertion causes the module to invalidate the address present on the address bus if CS# is seen active. AHOLD need not be asserted, nor is it even used as an input to the module. EADS# may be asserted at most once every other clock as that is the fastest module invalidation rate. The section titled "invalidation cycles" describes where EADS# may be asserted for maximum performance.

RESET

RESET is an asynchronous input that causes the module to reset its internal machines to a known state: its entire cache contents invalidated. There must be no bus activity for at least 4 clocks after the falling edge of RESET so the module can reset internally. At power up, RESET must be active for at least 100 clocks for the clock to reset itself. At all other times, one clock RESET is enough.

CPU Bus Interface Signals

These are signals generated by the module, or decoded from the CPU that correspond to the CPU bus.

Chip Select CS#

Chip Select is used to select the proper cache module if multiple modules are used, otherwise, with one module, CS# may be grounded. CS# is generated by decoding the lowest order tag addresses coming into the module. For example, two 128k cache modules would decode A16 for their chip selects. A 16 high would select module 1, while A16 low would select module 2. The following table summarizes the addresses used for decoding:

| SIZE | MODULES | ADDRESS BIT(S) TO DECODE |
|------|---------|--------------------------|
| 64K  | 2       | A15                      |
| 64K  | 4       | A15, A16                 |
| 128K | 2       | A16                      |
| 128K | 4       | A16, A17                 |

For compatibility, A16 and A17 may be decoded for 64k modules. Performance may be increased because of increased granularity, however, if A15 and A16 are used.

With CS# inactive, invalidation cycles are ignored, START# is inactive, and CKEN# is inactive. CKEN# does, however, always activate in T1 as it is not possible for the module to recognize CS# before then.

If required, the LOCK# signal may be used as a term in the creation of CS#. If locked cycles do not generate CS#, START# must be generated externally so memory may handle the cycle.

CPU Cache Enable CKEN#

CKEN# is generated by the module to indicate that its current transfer, during a read hit cycle, is cacheable. It is always driven (not an open-collector output) and must be used as one of the terms that generates KEN# to the Microprocessor. CKEN# is always active in T1, but then goes inactive and remains inactive unless the cycle is a read hit cycle.

For read miss and write cycles, CKEN# goes inactive in T2 and remains inactive until the next T1. It is the responsibility of the system to generate the KEN# signal to the CPU in these cases.

In a read hit cycle, CKEN# goes active again in the second T2 and remains active throughout the cycle. This forces external KEN# logic to active KEN# and make the cycle cacheable to the CPU. However, if the line being transferred is write-protected, AND the WPSTRP# pin is strapped low, CKEN# stays inactive in T2 and remains inactive throughout the cycle. This allows write protected lines in the module to be cacheable only to the module.

Burst Ready Out BRDYO#

The module generates BRDYO# when it is bursting data back to the CPU during read hit cycles, BRDYO# is always driven (not an open collector output) and should be used by external logic to create the BRDY# input signal to the CPU. Since the module is a zero waitstate, single clock burst cache, BRDYO# is activated in the first T2 until the fourth T2 unless the cycle is interrupted or not chip-selected.

Memory Interface Signals

Memory Interface Signals are signals coming to or from the main memory subsystem. The only signal the module generates to the memory system is START#.

PRSN#

This signal is pulled low inside the module. If the system pulls this signal high with a 10k pullup resistor, cache presence will be indicated by that line being pulled low. PRSN# signal is used to indicate that external logic should only start memory cycles when START# goes active rather than from ADS# active.

START#

START# is a signal asserted by the module to indicate that the memory subsystem must process the current cycle. START# is always driven and valid and is asserted for all read miss cycles and memory write cycles. START# is not activated for I/O cycles, or if CS# is sampled inactive. START# is normally active in the first T2, but may be delayed if an invalidation cycle forced the previous cycle to be extended (see "invalidation cycles").

Write Protect WP

The Write Protect input is an active high input that indicates to the module that the current line transfer is write-protected. It is sampled on the clock edge of the third BRDY# of a line transfer. SKEN# must be valid at the same time for the tag RAM to be updated. The module saves this information as a single bit in each tag location. In 128k configurations where there is a single tag for 2 consecutive lines, the write protect bit is valid for both lines. If a location has been write-protected, writes to that location will be ignored.

WP is a synchronous input and must meet the module setup and hold times regardless of whether it is being sampled or not.

Write Protect Strapping Option WPSTRP#

WPSTRP# is a strapping option that is sampled during RESET. It indicates whether write protected items in the module should be cacheable in the CPU cache. If WPSTRP# is high, CKEN# will go active in T2 during all read hit cycles to indicate that they are cacheable. If WPSTRP# is low, CKEN# will be inactive in T2 for read hit cycles to locations that are write-protected. This allows write protected items to be cached by the module and not by the CPU.

System Cache Enable SKEN#

The SKEN# input to the module (10), shown in FIG. 7, is like the KEN# input to the Microprocessor CPU (12). SKEN# is sampled just like KEN#, the clock before the first and last transfers of a line fill, to indicate whether the line is cacheable. There is one difference between SKEN# and KEN#. That is, if SKEN# is found active anytime after START# goes active until a clock before the first transfer, then the module will commence a line fill. If the KEN# input to the CPU is connected to the SKEN# input of the module, the CPU internal cache and the module will cache the same items. It is possible to control KEN# and SKEN# separately so the module and CPU cache different areas of memory.

SKEN# is a synchronous input and must meet the module setup and hold times regardless of whether it is being sampled or not.

Cache Ready and Burst Ready CRDY#, CBRDY#

CRDY# and CBRDY# are the ready and burst ready inputs to the module. They should behave exactly like the CPU RDY# and BRDY# inputs. CBRDY# should be used in conjunction with BRDYO# to generate the CPU BRDY# input. Likewise, CRDY# should be used to form the CPU RDY# input.

The module does not sample the CBRDY# or CRDY# inputs during read hits, so it is not possible to artificially add waitstates to the module's burst transfer. The CBRDY# and CRDY# inputs must, however, follow module setup and hold times even outside the sampling window.

System Configurations

The cache module can be optionally configured in or out of the system and is cascadable.

Single Cache

In a single cache configuration, the addition of a module requires no or little extra logic. Most of the signals are common to the CPU, the memory bus controller, and the module. The others, such as KEN#, SKEN#, and START# are described individually.

Microprocessor Bus Interface

As seen in FIG. 7, the CPU-related signals are connected to both the module and the memory controller. These are the address bus, data and parity bus, ADS#, W/R#, M/IO#, BE0#-BE3#, BLAST#, RESET, and CLK.

Since a single module resides on the address bus, CS# may be tied low so the part is always chip selected.

Memory Bus Interface

On the memory bus side, BOFF#, FLUSH#, and EADS# are connected to the CPU and the module in parallel. The memory ready signals, CRDY# and CBRDY#, are connected directly to the module, but are combined with other system ready signals to form the CPU RDY# and BRDY#. One of the system ready signals is the module BRDYO# which must be ANDed with CBRDY# and other burst ready signals to form BRDY# into the CPU.

The memory system must also generate the WP input. If write-protection is not needed, WP may be tied to Vss. If the system would like to prevent write-protected lines in the module from being cached by the i486, WPSTRP# should be tied to Vss.

KEN# and SKEN# Generation

The KEN# input to the Microprocessor is a result of all the cache enable signals in the system. Since the module activates CKEN# only during a read hit cycle, the CKEN# output may be ANDed with the system cache enable signal to form KEN# to the CPU.

If the module and CPU internal cache will cache the same areas of memory, the one SKEN# may be used both for the modules and for the CPU KEN# input. Otherwise, the memory system can generate 2 cache enable signals: One that is ANDed with CKEN# to produce KEN#, and another for the SKEN# input.

START# Generation

START# goes low to indicate that the memory system must complete the current cycle. This is true for all memory writes and read misses. It is the memory subsystem's responsibility to recognize I/O cycles and begin an I/O access without waiting for START#.

START# is asserted in T2, but may be delayed if there was an invalidation in the previous cycle (see "invalidation cycles"). Because the assertion of START# may be somewhat unpredictable, START# is used to either begin a DRAM RAS cycle, or enable DRAM output buffers.

Figure 8:
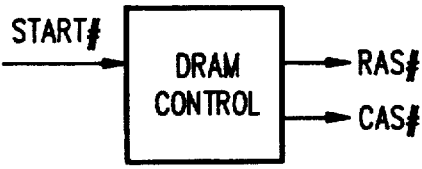
FIG. 8 shows that START# is the indication to DRAM control to supply the data/instruction.

FIG. 8 shows that START# may be the indication to DRAM control to begin a cycle. Once START# is sampled active, a RAS and CAS cycle begin. This will incur an extra waitstate to cache read misses since the earliest a memory cycle will begin is the first T2.

Figure 9:
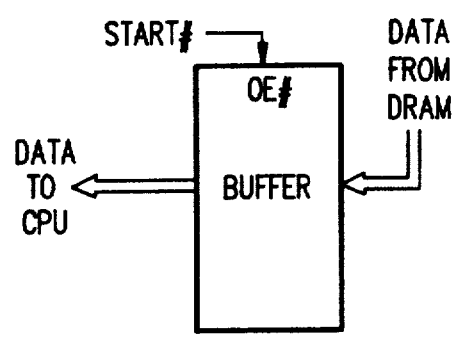
FIG. 9 shows how START# may be used to enable DRAM data buffers.

FIG. 9 shows that START# may enable DRAM data buffers. The actual DRAM cycle begins once ADS# and M/IO# are sampled low, but will not complete until the buffers have been gated, allowing data to be written to the CPU data bus. Should the cycle be a module read hit, the buffers are never enabled. Since the module takes 5 clock cycles to complete the burst transfer, RAS precharge time can easily be absorbed.

Multiple Cache

Figure 10:
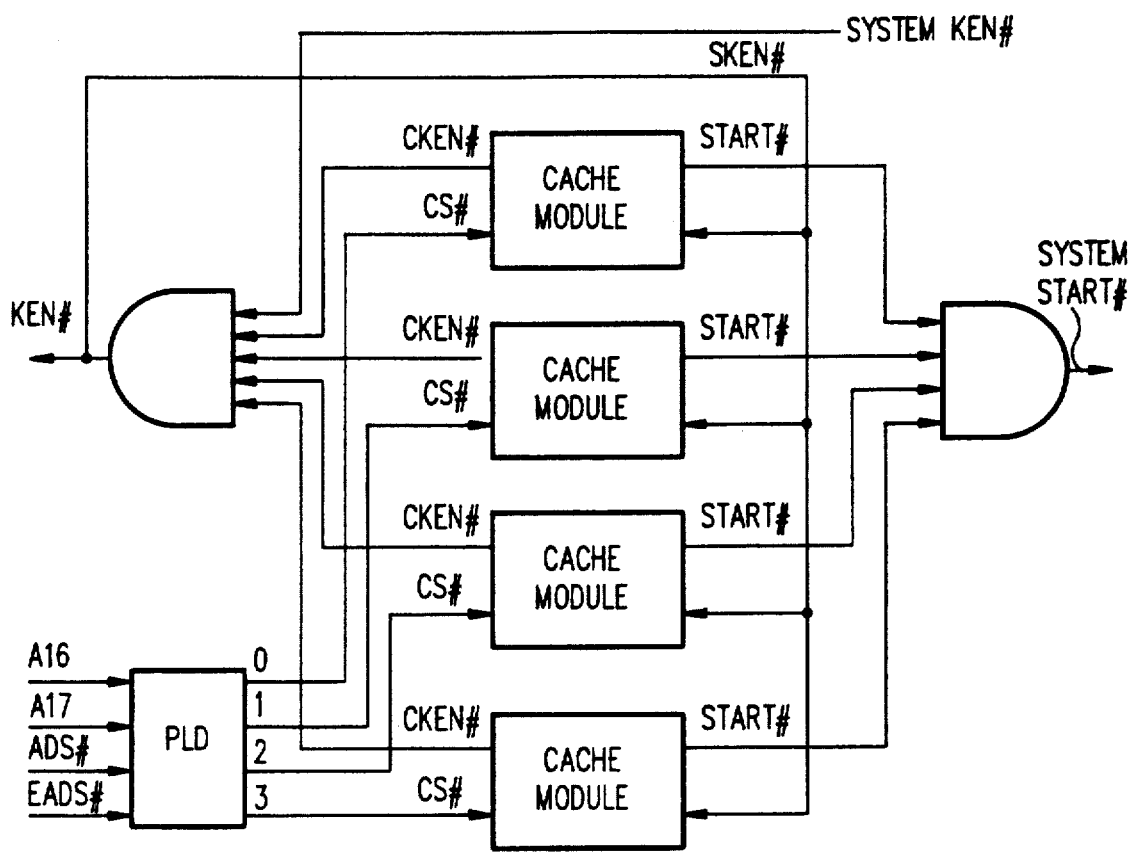
FIG. 10 is an example of a multiple cache configuration.

A multiple cache scheme is similar to the single cache scheme because all of the Microprocessor bus interface signal connection remain the same. Like the single cache example, only KEN#, SKEN#, START#, and now CS#, need special handling. FIG. 10 is an example of a 512k multiple cache configuration.

Memory Bus Interface

Like the Microprocessor bus interface signals, BOFF#, FLUSH#, and EADS# are connected to the CPU, memory system, and all caches in parallel. The ready and burst ready outputs from the memory system connect to the CRDY# and CBRDY# inputs to all module caches. The CBRDY# output is then ANDed with the BRDYO# outputs from all module's to form BRDY# to the CPU.

START#

START# is activated by a single module at a time because CS# is active for a single module at a time. START#, therefore, may be ANDed with all other START# signals to form a system start indication. See the section titled "Single Cache" for details how START# may be used.

KEN#

Like START#, CKEN# is only activated for chip selected modules. Therefore, all CKEN# outputs may be ANDed together to form the CPU KEN# signal. A system cache enable signal must also be included in the AND terms since it is the system's responsibility to generate KEN# during read miss cycles.

SKEN#

Since SKEN# is used during read miss cycles and ignored otherwise, the system cache enable signal can be connected to all module modules' SKEN# inputs. If multiple sources can create the KEN# signal to the CPU, KEN# may be fed into all module modules. If the CPU caches different memory locations than the second-level cache, SKEN# must be generated separately and then connected to all module inputs.

CS#

Chip select is used to identify which module is being addressed. It is the result of decoding the lowest order tag address bits. FIG. 10 shows how a PLD chooses one of four module caches. Anytime an address is present on the address bus, including invalidation cycles, one of the module caches is selected.

Optional Cache

The cache module fits into the system as an optional cache. However, its most powerful feature is allowing a system to reconfigure itself easily once a cache module has been installed. To accomplish this, the module is a write-through cache with all signals feeding around the memory subsystem so that the signals perform properly whether the module is present or not. There are only a few considerations that need to be made to allow the module to be fully optional.

Signal Considerations: START#, CKEN#, BRDYO#

The PRSN# presence pin is connected into the memory controller that accepts START#. If PRSN# is high, the module is not present, and all memory cycles begin with the assertion of ADS#. START# in this case should be provided with a pullup resistor to ensure that it is not left floating when the module is not present.

When the module is removed from a system the CKEN# and BRDYO# signals, that are combined with external logic to form KEN# and BRDY#, will be left floating; therefore all CKEN#, BRDYO#, START#, and PRSN# pins should have pullup resistors tied to them. This assures an inactive state when no module is present.

Considerations With Multiple Caches

As long as all the START#, CKEN#, BRDYO#, and PRSN# signals have pullup resistors tied to them, all empty cache sockets will respond like inactive caches. There is, however, a chip selecting problem since CS# decoding varies with the number of caches that are present.

Figure 11:
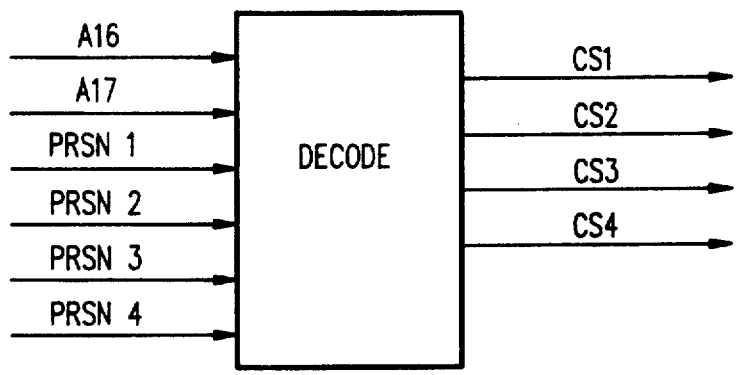
FIG. 11 shows chip select decoding logic.

The chip select decoding logic, as FIG. 11 shows, has all PRSN# pins as input so that from this information the correct chip select decoding can be generated. The logic in FIG. 11 is able to keep CS1 asserted if one cache is detected, decode A16 if 2 caches are detected, or decode A16 and A17 if all 4 caches are present.

Sectored vs Non-Sectored Cache

The 64k module is a 64k non-sectored cache, which means that each tag of the cache points to 1 line of data in the cache memory. A 128k cache requires twice the number of tags to be non-sectored. This increases tag size, complexity, and reduces tag lookup speed. For this reason, the 128k module is a sectored cache. Each tag in the 128k module points to 2 consecutive lines in the cache. A Line Select bit, address bit A4, determines which line is being referenced.

Figure 12:
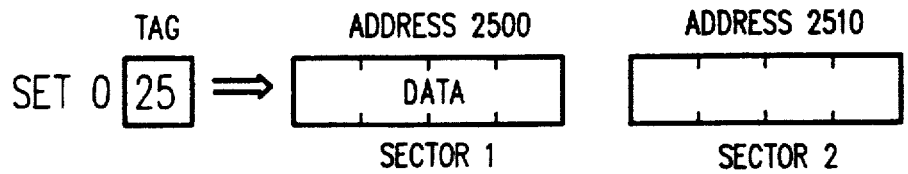
FIG. 12 illustrates one tag in a sectored cache.

FIG. 12 illustrates one tag in a sectored cache. If this tag points to address 2500h, then the adjacent line is reserved for address 2510h (A4 high). If, for example, address 2510 had been written first, the tag would still contain 25 and only address 2500 could be placed in the first line without inactivating address 2510.

Since the Line Select Bit is used for a sectored architecture, all set and tag address bits are shifted higher in the address space. The 128k module internally compensates for this shift so pin-compatibility with the 64k module is maintained. This allows either cache configuration, 64k module or 128k module, to be hardware transparent.

Because a sectored cache references two consecutive lines, the odds of filling both lines is reduced, and thus the hit rate of the cache is reduced. A sectored cache has a slightly reduced hit rate compared to an equivalent non-sectored cache, but the performance penalties are minimal (1 to 2 percent). A two-way set associative sectored 128k cache offers better performance than a direct mapped 128k non-sectored cache.

Performance Considerations

SKEN# Assertion

SKEN# is an input to the module to indicate the cacheability of a line during a read miss cycle. It is sampled exactly like KEN# in the CPU, one clock before the first dword transfer of a line fill, and one clock before the last dword.

During a line fill, the module loads the dwords of the line directly into the appropriate spot in cache memory. This means that once SKEN# has been sampled active by the module, it must commit a line and invalidate a location to prepare for the incoming line. Once a line fill completes with a proper SKEN#, the line can be validated.

Figure 13:
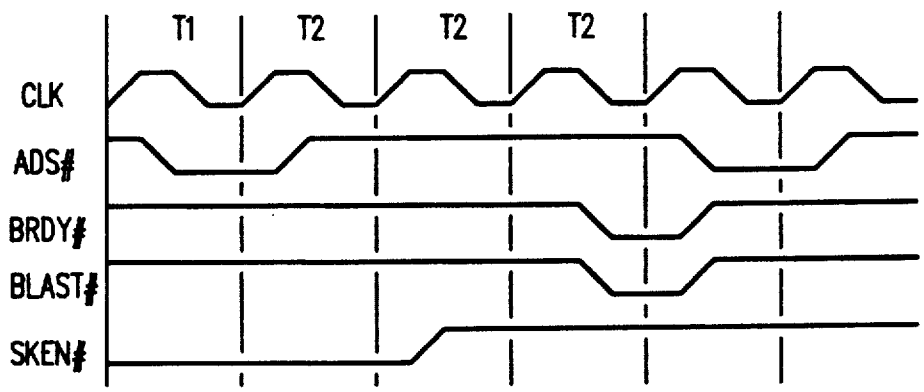
FIG. 13 is a timing diagram for the logic shown in FIG. 7.

A potential performance loss exists if during non-cacheable cycles, SKEN# is kept active, and then made inactivate the clock before the first transfer (see FIG. 13). Once the module sees SKEN# low in T1, it commits a line in the cache by invalidating an entry despite the fact that SKEN# is later deasserted. The performance loss is avoided by holding SKEN# inactive until cacheability is determined.

Invalidation Window

When an invalidation is requested with the assertion of EADS#, the module must immediately invalidate the address present on the address bus. If the tag portion of the module is in use, the invalidation takes priority and will postpone the other action. This may decrease performance. To avoid this, EADS# should not be issued in the second, third or fourth transfer of a cache read miss cycle. The section titled "Invalidation Cycles" explains this in detail.

BOFF# Assertion

If BOFF# is asserted and the module is in the middle of a cacheable read miss cycle, the module treats the current line fill as non-cacheable. Once BOFF# is released and the cycle continues, the module will treat the rest of the cycle as a non-cacheable cycle.

In most systems BOFF# is a rare occurrence, thus the performance loss is negligible. If, however, BOFF# is regular and predictable, system performance can be increased by timing BOFF# so that the four dword transfers of a line fill are never interrupted. The section titled "BOFF# Cycles" under Functional Description explains aborted cycles in more detail.

START# Predictability

START# is asserted in the first T2 of a read miss cycle unless the previous cycle was extended. The section titled "Invalidation Cycles" explains why START# may be delayed. If START# must be a predictable signal to the system, and invalidation cycles cannot be timed to occur before the second transfer of a read miss cycle, there is a way to ensure the predictability of START#.

When EADS# is asserted towards the end of a read miss cycle, there are 3 tag accesses that need to be made before T1 of the next cycle: invalidate lookup, the actual invalidation (if a hit), and validation of the current line fill (if cacheable). Since there is no way to predict the hit/miss possibility of an invalidation request, it is assumed that 2 tag accesses will be required to service it.

Figure 14:
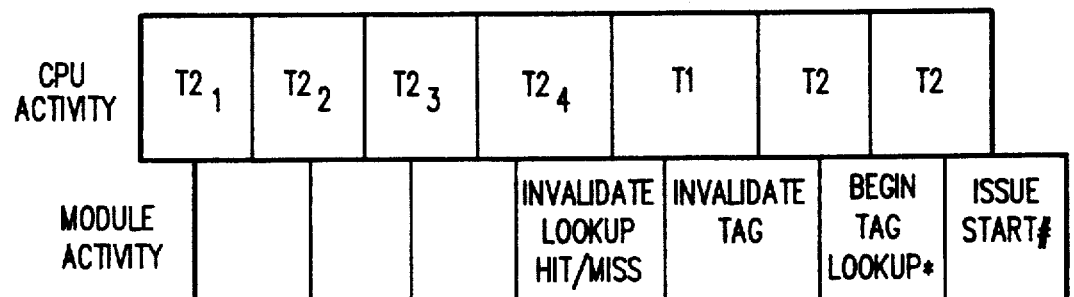
FIG. 14 shows how assertion of EADS# during the third transfer of a burst cycle incurs 1 clock delay in START#.
Figure 15:
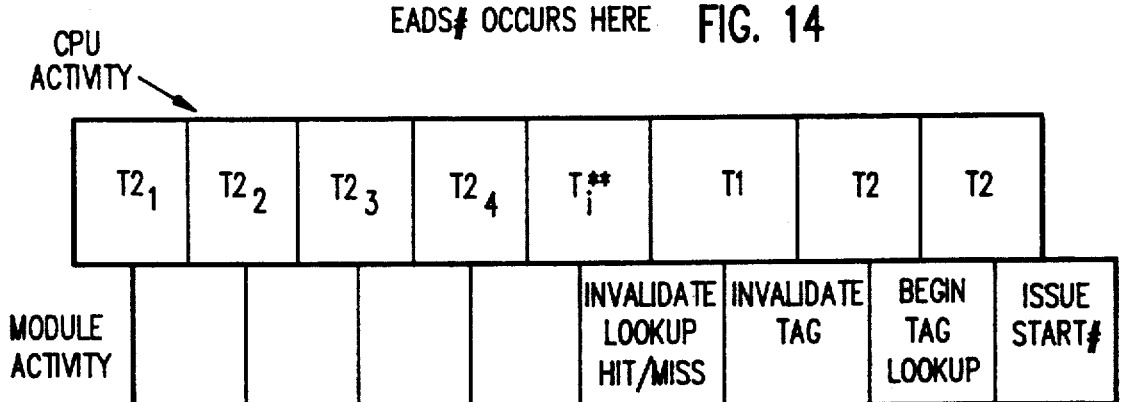
FIG. 15 shows EADS# assertion in the fourth clock and the resulting two clock delay in START#; and, FIG. 16 shows EADS# assertion in the second clock.
Figure 16:
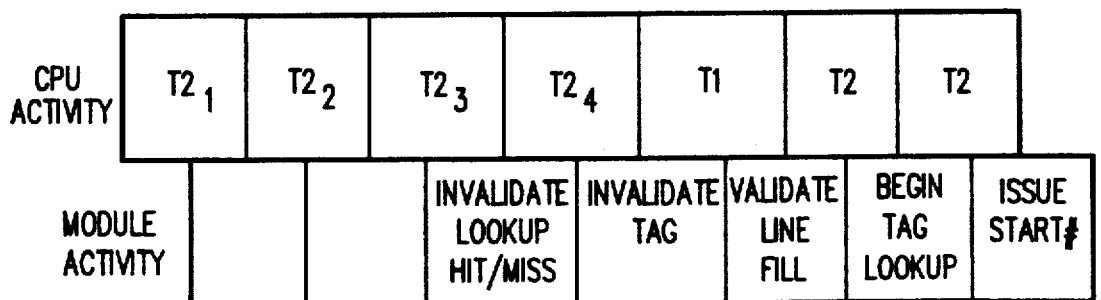

To do this, SKEN# to the module may be deasserted if AHOLD is detected. If SKEN# is deasserted the clock before the last CBRDY#, the line is non-cacheable. FIG. 14 shows how assertion of EADS# during the third transfer of a burst cycle incurs a 1 clock delay in START#. FIG. 15 shows EADS# assertion in the fourth clock, but since AHOLD will cause the CPU to delay ADS# at least one extra clock, START# is delayed only 1 clock as well. Assertion of EADS# in the second transfer of a burst causes a 1 clock delay in START# without deasserting SKEN# (see FIG. 16), so there is no advantage in dropping SKEN# for EADS# assertion then.

In summary, if SKEN# is deasserted in response to AHOLD during the third of fourth transfer of a line fill, START# will be delayed at most 1 clock. This makes START# predictable: It will always be valid in the second T2 of a read miss cycle. Note that if START# was not delayed, its value is retained in the second T2.

While the invention has been particularly shown and described with reference to preferred embodiments thereof, it will be understood by those skilled in the art that the foregoing and other changes in form and detail may be made therein without departing from the scope of the invention.

What is claimed is:

1. In a data processing system in which a processor (12) communicates over a CPU bus (14, 15, 29) with a main memory (9), said CPU bus including an address bus having a number of address bits, the combination comprising:
   a cache controller (10);
   said cache controller including CPU bus control logic (28) connected to said CPU bus for controlling access to said CPU bus,
   a cache data-array (8) connected to said cache controller (10) and to said CPU bus;
   said number of address bits comprised of a line select bit, a tag portion, a set portion, and a line portion, a line consisting of a plurality of data bytes, said line being the basic unit of data transferred between said cache (8) and said main memory;
   control logic in said cache controller for controlling references to said cache data-array (8);
   said control logic including a cache directory, said cache directory including an address store (24) for storing tag fields, each tag field identifying a memory location in said main memory that is associated with an address block stored in said data-array cache (8);
   said directory including means (36) for generating a cache data-array address comprised of a set portion identical to said set portion of aid address bus, a line portion identical to said line portion of said address bus, and a way portion;
   a plurality of address blocks stored in said address store (24), each address block describing a physical address of a number of contiguous lines of data stored in said cache data-array (8);
   a plurality of valid bits stored in said address store (24), each valid bit being associated with each one of said lines of data within said address block in said address store, such that if a particular line of data is present in said cache (8), then the valid bit for that line is on, and if a particular line is not present in said cache, then the valid bit for that line is off;
   said cache directory being capable of being configured into at least two ways (WAY0, WAY1), each way providing storage for said tag fields and said valid-bits for facilitating the associative searching of said directory for a particular tag field;
   each of said ways containing tags, each tag including at least two of said plurality of valid bits such that when said cache is configured as an n-byte cache, each tag references a single, multi-byte line and when configured as a 2n-byte cache, each tag references two consecutive multi-byte lines, to effectuate sectoring wherein said cache contains at least two sectors per tag, said line select bit of said address bus being used to determine which sector of each tag is being selected;
   said directory including a decoder connected to said address bus and to said address store,
   said address store being divided into a plurality of sets (SET 0-SET 63), each set being a grouping of said address blocks consisting of one address block from each way, all of the address blocks in a set being simultaneously selected by said decoder in response to the decoding of said set portion of said bus address; and,
   means for activating said line select bit to thereby select sectored cache operation or non-sectored cache operation.

2. The combination in accordance with claim 1 further comprising:
   a number of compare circuits (30, 32) equal to the number of said ways, such that simultaneous comparisons are made in said compare circuits between said tag portion of said bus address and said tag fields in aid ways to determine if data corresponding to said bus address is in said cache data-array (8), a hit occurring when said tag field of an address block matches said tag portion of said bus address and the valid bit of the line specified in said bus address is on; and, encoding means (36) responsive to said compare circuits (30, 32), for generating an output, said output being said way portion of said cache data array address.

3. The combination in accordance with claim 1 further comprising:

a line select pin connected to said cache controller; and wherein, said means for activating sectored cache operation or a non-sectored cache operation includes means for effectuating sectored cache operation upon the condition that said line select bit of said address bus is connected to said line select pin.

* * * * *